US012175505B2

(12) United States Patent
Ramakrishnan et al.

(10) Patent No.: US 12,175,505 B2
(45) Date of Patent: Dec. 24, 2024

(54) METHODS AND APPARATUS FOR ANOMALY DETECTIONS

(71) Applicant: Walmart Apollo, LLC, Bentonville, AR (US)

(72) Inventors: Jagdish Ramakrishnan, Foster City, CA (US); Elham Shaabani, Redwood City, CA (US); Chao Li, San Carlos, CA (US); Matyas A. Sustik, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 220 days.

(21) Appl. No.: 16/427,241

(22) Filed: May 30, 2019

(65) Prior Publication Data

US 2020/0380571 A1 Dec. 3, 2020

(51) Int. Cl.
| | |
|---|---|
| G06Q 30/00 | (2023.01) |
| G06F 17/00 | (2019.01) |
| G06F 17/11 | (2006.01) |
| G06N 20/00 | (2019.01) |
| G06Q 10/00 | (2023.01) |
| G06Q 10/0637 | (2023.01) |
| G06Q 20/00 | (2012.01) |
| G06Q 20/20 | (2012.01) |

(Continued)

(52) U.S. Cl.
CPC ......... *G06Q 30/0283* (2013.01); *G06F 17/11* (2013.01); *G06N 20/00* (2019.01); *G06Q 10/06375* (2013.01); *G06Q 20/201* (2013.01); *G06Q 30/0206* (2013.01); *G06F 2218/08* (2023.01)

(58) Field of Classification Search
CPC .......................................... G06Q 10/00–50/00
USPC ....................................................... 705/7.35
See application file for complete search history.

(56) References Cited

U.S. PATENT DOCUMENTS 5,172,314 A * 12/1992 Poland ................. G06Q 20/201
235/383
7,302,410 B1 11/2007 Venkatraman et al.
(Continued)

OTHER PUBLICATIONS

Swalin, "How to Make Your Machine Learning Models Robust to Outliers", (2018) p. 1-14.

(Continued)

*Primary Examiner* — Mustafa Iqbal
(74) *Attorney, Agent, or Firm* — Morgan, Lewis & Bockius LLP; Manita Rawat

(57) ABSTRACT

This application relates to apparatus and methods for identifying anomalies within data, such as pricing data. In some examples, a computing device receives data updates and selects a machine learning model to apply to the data update. The computing device may train the machine learning model with features generated based on historical purchase order data. An anomaly score is generated based on application of the machine learning model. Based on the anomaly score, the data update is either allowed, or denied. In some examples, the computing device re-trains the machine learning model with detected anomalies. In some embodiments, the computing device prioritizes detected anomalies for further investigation. In some embodiments, the computing device identifies the cause of the anomalies by identifying at least one feature that is causing the anomaly.

20 Claims, 6 Drawing Sheets

(51) Int. Cl.
*G06Q 30/0201* (2023.01)
*G06Q 30/0283* (2023.01)

(56) References Cited

U.S. PATENT DOCUMENTS

| | | |
|---|---|---|
| 7,574,382 B1 | 8/2009 | Hubert |
| 7,818,797 B1 | 10/2010 | Fan et al. |
| 9,916,563 B1 | 3/2018 | Labanca, Jr. et al. |
| 10,102,056 B1 | 10/2018 | Goldberg |
| 10,140,623 B1 | 11/2018 | Lloyd et al. |
| 2003/0126097 A1* | 7/2003 | Zhang ................ G06Q 30/0283 705/400 |
| 2003/0212609 A1 | 11/2003 | Blair et al. |
| 2005/0184157 A1* | 8/2005 | Craig .................... G06Q 30/06 235/462.01 |
| 2007/0061174 A1 | 3/2007 | Philips |
| 2008/0103855 A1 | 5/2008 | Hernandez et al. |
| 2010/0121663 A1* | 5/2010 | Valeriano ............... G06Q 30/06 705/400 |
| 2015/0161394 A1* | 6/2015 | Ferragut ............ H04L 63/1425 726/25 |
| 2015/0324737 A1 | 11/2015 | Chrzan et al. |
| 2015/0363820 A1 | 12/2015 | Leitersdorf et al. |
| 2017/0091657 A1 | 3/2017 | Kida et al. |
| 2017/0366568 A1* | 12/2017 | Narasimhan ............ G06F 17/16 |
| 2019/0310888 A1 | 10/2019 | Lessin et al. |
| 2019/0325534 A1 | 10/2019 | Perry et al. |
| 2020/0234321 A1* | 7/2020 | Urban ................. G06F 16/2365 |

OTHER PUBLICATIONS

M. Bozbura et al., "Detection of e-commerce Anomalies using LSTM-recurrent Neural Networks," In Proceedings of the 8th International Conference on Data Science, Technology and Applications, Jan. 2019, pp. 217-224.

* cited by examiner

METHODS AND APPARATUS FOR ANOMALY DETECTIONS

TECHNICAL FIELD

The disclosure relates generally to retail systems and, more specifically, to systems and methods for retail data anomaly detection and correction.

BACKGROUND

Retailers often change the selling price of an item. For example, online retailers may update prices of items sold on their websites. The prices of the items may be based on external factors, such as competitor prices, and internal factors, such as costs. If any external factor or internal factor changes, the price of the item may need to be adjusted. Similarly, the cost of items can change as well. For example, supply costs, labor costs, or delivery costs associated with items may increase or decrease. At least some of the time errors, such as data entry errors, may lead to the listing of a wrong price or cost of an item. As a result, a retailer's sales may be affected. For example, if the price of an item is priced lower than intended, the retailer may lose money (or, at the very least, not make as much money) on each sale of the item. If an item is priced higher than intended, the retailer may not sell as many items as if the item were correctly priced. Similarly, if the cost of an item is incorrect, the retailer may price the item incorrectly, thereby, at least in some cases, decreasing profitably. As such, a retailer may benefit from identifying and correcting item pricing and cost errors.

SUMMARY

The embodiments described herein are directed to automatically identifying anomalies, such as item price and cost anomalies. The embodiments may allow a retailer to scrutinize a price or cost update to determine if the price or cost update is an anomaly. The embodiments may allow the retailer to correct the anomaly before the item is sold for a price that is based on the anomaly, for example. As a result, the embodiments may allow a retailer to decrease the chances that prices of items are set based on anomalies, which may increase the profitability of those sold items. Other advantages are recognized by those of ordinary skill in the art having the benefit of these disclosures.

In accordance with various embodiments, exemplary systems may be implemented in any suitable hardware or hardware and software, such as in any suitable computing device. For example, in some embodiments, a computing device is configured to receive an indication that a value update is an anomaly. The value update may be a price update, or a cost update, for an item, for example. The computing device may identify a plurality of features associated with the value update. The computing device may determine a feature anomaly value for each feature of the plurality of features based on a first value of each feature and a second value of a second feature. The second feature may be a cost feature, for example. The computing device may determine an anomaly causing feature of the plurality of features based on the determined feature anomaly values for each feature of the plurality of features. The computing device may transmit data identifying the anomaly causing feature. In some examples, the computing device transmits the data identifying the anomaly causing feature to a pricing system, which causes the pricing system to not consider the value update when determining a price for a corresponding item.

In some embodiments, a method is provided that includes receiving an indication that a value update is an anomaly. The method may include identifying a plurality of features associated with the value update. The method may also include determining a feature anomaly value for each feature of the plurality of features based on a first value of each feature and a second value of a second feature. The method may include determining an anomaly causing feature of the plurality of features based on the determined feature anomaly values for each feature of the plurality of features. The method may further include transmitting data identifying the anomaly causing feature. In some examples, the method includes transmitting the data identifying the anomaly causing feature to a pricing system, which causes the pricing system to not consider the value update when determining a price for a corresponding item.

In yet other embodiments, a non-transitory computer readable medium has instructions stored thereon, where the instructions, when executed by at least one processor, cause a computing device to perform operations that include identifying a plurality of features associated with the value update. The operations may also include determining a feature anomaly value for each feature of the plurality of features based on a first value of each feature and a second value of a second feature. The operations may include determining an anomaly causing feature of the plurality of features based on the determined feature anomaly values for each feature of the plurality of features. The operations may further include transmitting data identifying the anomaly causing feature. In some examples, the operations includes transmitting the data identifying the anomaly causing feature to a pricing system, which causes the pricing system to not consider the value update when determining a price for a corresponding item.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
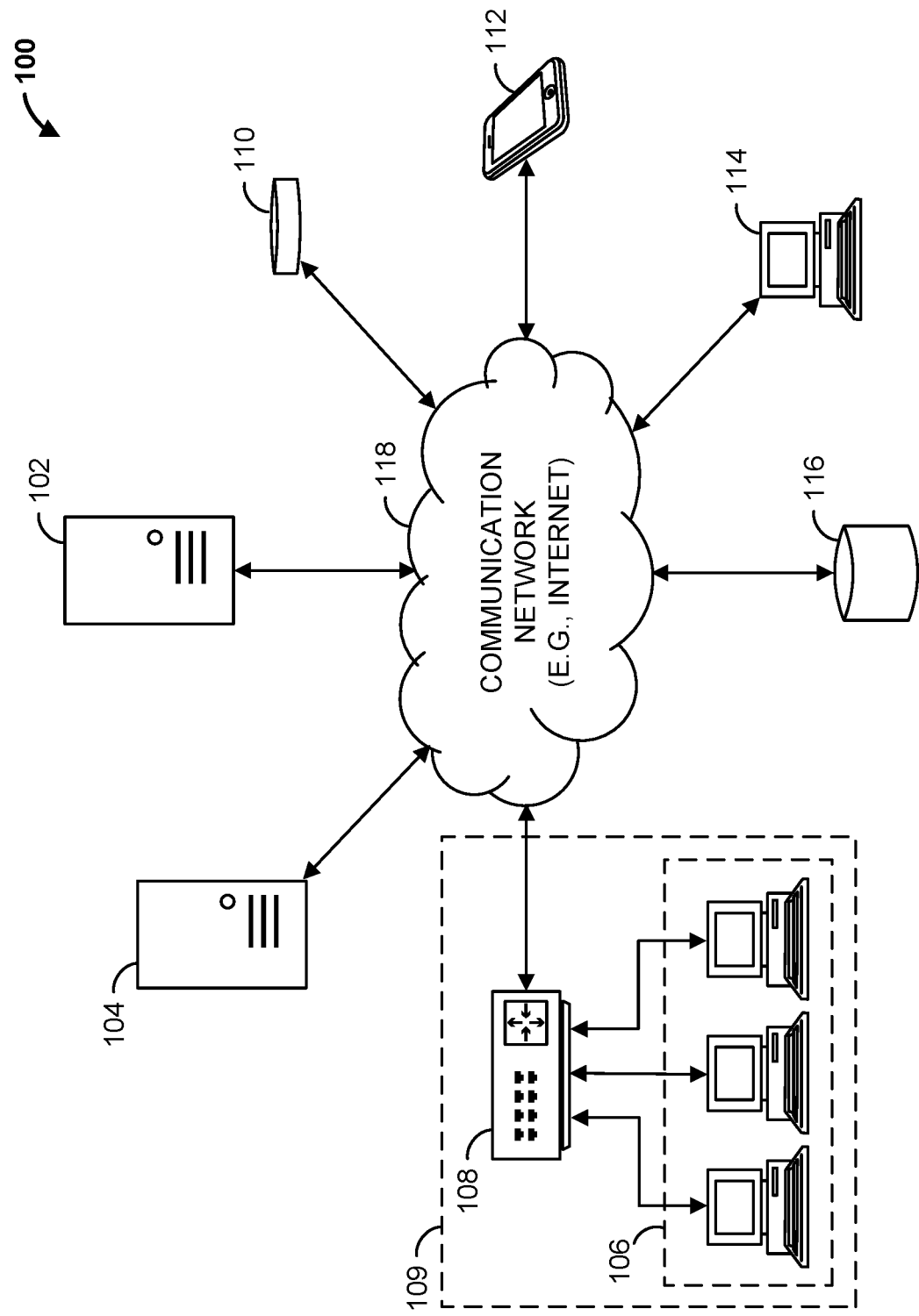
FIG. 1 is a block diagram of an anomaly detection system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of an anomaly detection system 100 that includes an anomaly detection computing device 102 (e.g., a server, such as an application server), a server 104 (e.g., a web server), workstation(s) 106, database 116, and multiple customer computing devices 110, 112, 114 operatively coupled over network 118. Anomaly detection computing device 102, workstation(s) 106, server 104, and multiple customer computing devices 110, 112, 114 can each be any suitable computing device that includes any hardware or hardware and software combination for processing and handling information. In addition, each can transmit data to, and receive data from, communication network 118.

For example, anomaly detection computing device 102 can be a computer, a workstation, a laptop, a server such as a cloud-based server, or any other suitable device. Each of multiple customer computing devices 110, 112, 114 can be a mobile device such as a cellular phone, a laptop, a computer, a table, a personal assistant device, a voice assistant device, a digital assistant, or any other suitable device.

Additionally, each of anomaly detection computing device 102, server 104, workstations 106, and multiple customer computing devices 110, 112, 114 can include one or more processors, one or more field-programmable gate arrays (FPGAs), one or more application-specific integrated circuits (ASICs), one or more state machines, digital circuitry, or any other suitable circuitry.

Although FIG. 1 illustrates three customer computing devices 110, 112, 114, anomaly detection system 100 can include any number of customer computing devices 110, 112, 114. Similarly, anomaly detection system 100 can include any number of workstation(s) 106, anomaly detection computing devices 102, servers 104, and databases 116.

Workstation(s) 106 are operably coupled to communication network 118 via router (or switch) 108. Workstation(s) 106 and/or router 108 may be located at a store 109, for example. Workstation(s) 106 can communicate with anomaly detection computing device 102 over communication network 118. The workstation(s) 106 may send data to, and receive data from, anomaly detection computing device 102. For example, the workstation(s) 106 may transmit data related to a return, such as the return of an item, to anomaly detection computing device 102. In response, anomaly detection computing device 102 may transmit an indication of whether the return of the item is suspected of being fraudulent. Workstation(s) 106 may also communicate with server 104. For example, server 104 may be a web server and host one or more web pages, such as a retailer's website. Workstation(s) 106 may be operable to access and program (e.g., configure) the webpages hosted by server 104.

Anomaly detection computing device 102 is operable to communicate with database 116 over communication network 118. For example, anomaly detection computing device 102 can store data to, and read data from, database 116. Database 116 can be a remote storage device, such as a cloud-based server, a memory device on another application server, a networked computer, or any other suitable remote storage. Although shown remote to anomaly detection computing device 102, in some examples, database 116 can be a local storage device, such as a hard drive, a non-volatile memory, or a USB stick.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

First customer computing device 110, second customer computing device 112, and $N^{th}$ customer computing device 114 may communicate with web server 104 over communication network 118. For example, web server 104 may host one or more webpages of a website. Each of multiple computing devices 110, 112, 114 may be operable to view, access, and interact with the webpages hosted by web server 104. In some examples, web server 104 hosts a web page for a retailer that allows for the purchase of items. For example, the web page may list prices for advertised items. An operator of one of multiple computing devices 110, 112, 114 may access the web page hosted by web server 104, add one or more items to an online shopping cart of the web page, and perform an online checkout of the shopping cart to purchase the items.

Anomaly detection computing device 102 may identify whether an item price or cost update is an anomaly. The item price may be the price of an item offered for sale by a retailer operating anomaly detection computing device 102, or a price of an item as offered by a competitor, such as offered on a competitor's website, for example. If the updated price or cost of the item is an anomaly, anomaly detection computing device 102 may report the anomaly. In some examples, anomaly detection computing device 102 prevents the price or cost update from taking effect. Anomaly detection computing device 102 may determine whether a price or cost update is an anomaly based on the execution of one or more machine learning algorithms. The machine learning algorithms may be based on unsupervised and/or supervised machine learning models. Unsupervised machine learning models include machine learning models that are trained with unlabeled feature data, while supervised machine learning models are trained with labelled (e.g., example input and output) feature data.

For example, anomaly detection computing device 102 may employ an unsupervised learning algorithm such as a Guasian Naïve Bayes model, Isolation Forest model, Autoencoder model, or any other suitable unsupervised learning algorithm or feature engineering technique. Similarly, anomaly detection computing device 102 may employ a supervised learning algorithm such as Random Forest, Gradient Boosting Machines, or any other suitable supervised learning algorithm or feature engineering technique.

Anomaly detection computing device 102 may train the machine learning models with various types of features including, for example, price-based features, binary features, categorical features, hierarchical features, and feature transformations. Price-based features may include features based on current prices, historical prices (e.g., average historical price), competitor prices, and prices from other channels, such as in-store prices for an online retailer. Binary features may include features based on whether an items is part of a marketing campaign, or whether the item is part of an advertising bundle, for example. Categorical features may include features based on the type of promotion an item is associated with, or a type of pricing algorithm that is used to price the item. Anomaly detection computing device 102 may convert categorical features into binary form for modelling purposes. Hierarchical features may include features identifying a category, a sub-category, a department, a super-department, or a division of an item.

Anomaly detection computing device 102 may obtain features from database 116 and, in some examples, transform them for use with the machine learning models. For example, for price based features, one set of transformations identifies how far a price is from a cost of an item, which may be based on differences determined by the equation below:

$$x_i - x_c \qquad (\text{eq. 1})$$

where:

$i \in P$, $x_i \neq x_c$;

P represents a feature set;

$x_i$ is the $i^{th}$ feature of the feature set; and $x_c$ is a cost feature.

In some examples, P may represent an item price and cost feature set. In some examples, P may represent a baseline price and cost feature set. In some examples, P may represent an average historical price feature set (e.g., average price over last month). In some examples, P represents a categorical, a binary, a hierarchical, or numerical feature set. In some examples, differences may be based on margins as determined by the equation below:

$$\frac{x_i - x_c}{x_c} \qquad (\text{eq. 2})$$

where:

$i \in P$, $x_i \neq x_c$;

Similarly, the same set of transformations can be applied using $x_p$ in place of $x_c$, where i is over all elements in P (in some examples, all elements in P other than $x_p$ and $x_c$).

For some models, such as Autoencoder, log based transformations improve performance and minimize machine learning times. Log based feature transformations may be computed according to the equation below:

$$\log\left(\frac{x_i + c_1}{x_c + c_1}\right) + c_2 \qquad (\text{eq. 3})$$

where:

$i \in P$, $x_i \neq x_c$; and $c_1$, $c_2$ are constants.

In some examples, a Gaussian Naïve Bayes model is employed. For example, anomaly detection computing device 102 may determine a probability distribution based on the equation below:

$$p(x) = \prod_{i \in \mathcal{A}_L} p(x_i) \qquad (\text{eq. 4})$$

where:

$p(x_i)$ is the likelihood corresponding to feature $x_i$;

$\mathcal{A}_L$ represents a feature set as represented by a log based feature transformation (e.g., equation (3));

$$p(x_i) = \frac{1}{\sqrt{2\pi\sigma_i^2}} \exp\frac{-(x_i - \mu_i)^2}{2\sigma_i^2}; \qquad (\text{eq. 5})$$

$\mu_i$ represents the mean of the $i^{th}$ feature; and $\sigma$ represents the standard deviation of the $i^{th}$ feature.

In some examples, an item may be associated with a particular hierarchical level, where a different machine learning model is applied at each particular hierarchical level.

Once trained, anomaly detection computing device 102 may employ one or more of the machine learning algorithms. For example, anomaly detection computing device 102 is operable to update a price or cost update for an item, such as an item that is currently being sold on a retailer's website and and/or a store location. The price or cost update may be based on one or more factors, such as external factors or internal factors. In some examples, external factors include pricing data of the same or similar item as advertised by competitor retailers. The price or cost update may be received in real time. Based on the price or cost update, anomaly detection computing device 102 may execute one or more of the machine learning algorithms to determine an anomaly score. The anomaly score indicates a likelihood that the update is an anomaly. For example, a low anomaly score may indicate that the price or cost update has a lesser chance of being an anomaly that a high anomaly score.

In some examples, anomaly detection computing device 102 may perform item price or cost checks periodically in batches. For example, database 116 may store prices for a plurality of items sold on a retailer's website and/or in stores, such as in store 109. Anomaly detection computing device 102 may periodically (such as nightly, hourly, weekly) may execute one or more of the machine learning algorithms to determine an anomaly score for each of the items.

Whether receiving a real-time price or cost update or performing a periodic price or cost check, anomaly detection computing device 102 may determine if the price or cost update is an anomaly based on the anomaly score. If the price or cost update is determined to be an anomaly, anomaly detection computing device 102 may transmit an indication of the anomaly to another computing device, such as to workstation 106 at store 109. In some examples, anomaly detection computing device 102 may transmit the indication via email, short message service (SMS), or any other suitable communication method.

In some examples, anomaly detection computing device 102 may identify the cause of the price or cost anomaly. For example, each feature used to determine the anomaly may be assigned a feature anomaly score. To obtain a feature anomaly score, a log transformation of the density may be determined, where the resulting quantity is multiplied by a constant. For example, feature anomaly scores may be determined based on the following equation:

$$A(x) = \sum_{\{i \in A_L : A_i(x_i) \neq NaN\}} A_i(x_i) \quad \text{(eq. 6)}$$

$$A_i(x_i) = \sum_{i \in A_L} \frac{(x_i - \mu_i)^2}{\sigma_i^2}. \quad \text{(eq. 7)}$$

Here, $A_i(x_i)$ is the feature anomaly score associated with the ith feature, and is assigned to "NaN" (i.e., not a number) whenever the numerator feature is missing (e.g., the feature doesn't exist, such as if there is no associated competitor price). In addition, a threshold E may be chosen such that if $A(x)$ is greater than $\epsilon$, an anomaly is determined.

In some examples, a threshold $\epsilon$ is selected that maximizes a standard $F_1$ score (also known as F-score or F-measure) given by the below equation:

$$F_1 = 2\frac{\text{precision} - \text{recall}}{\text{precision} + \text{recall}} \quad \text{(eq. 8)}$$

For example, cross-validation may be used on a test set where each fold is predicted using a threshold selected from maximizing the $F_1$ score from remaining folds. An alternative approach includes selecting the threshold that maximizes a recall at a minimum precision level, e.g., 0.80.

In some examples, an $F_\beta$ score, rather than the $F_1$ score, is maximized as determined given by the equation below:

$$F_\beta = (1 + \beta^2) \frac{\text{precision recall}}{(\beta^2 \text{precision}) + \text{recall}} \quad \text{(eq. 9)}$$

In some examples, the threshold $\epsilon$ is chosen that maximizes the recall given a minimum precision, such as 80%.

In some examples, L[i] is defined for $i \in \mathcal{A}_L$ to be the name of the numerator feature associated with the ith feature. For example, a numerator feature of "log((Price+c1)/(Cost+c1))+c2" may may be named "Price." Based on the feature anomaly scores and their associated names, anomaly detection computing device 102 may provide a list of suspected issues, where the list identifies the corresponding names for the features in L[i]. The list may be represented by an array S(x), for example. The pseudo code listing shown below represents an algorithm for computing array S(x) that may be executed by anomaly detection computing device 102.

| PSEUDO CODE LISTING |
| --- |
| 1  function get_suspected_issues ({$x_i$, $A_i(x_i)$, L[i] for i ∈ $\mathcal{A}_L$}); |
|    Input :features $x_i$, $A_i(x_i)$, L[i] for i ∈ $\mathcal{A}_L$, threshold $\epsilon_s$ |
|    Output:list of suspected issues, S(x) |
| 2      S(x) = [ ] |
| 3      num_not_null = 0 |
| 4      for i ∈ $\mathcal{A}_L$ do |
| 5         if $A_i(x_i) \geq \epsilon_s$ then |
| 6            S(x).append(L[i]) |
| 7         else if $A_i(x_i) \neq$ NaN then |
| 8            num_not_null += 1 |
| 9         end |
| 10     end |
| 11     if num_not_null ≤ 2 then |
| 12        S(x).append("Cost") |

| PSEUDO CODE LISTING -continued |
| --- |
| 13     else if len(S(x)) > 1 then |
| 14        S(x) = ["Cost"] |
| 15     end |
| 16     if "Cost" in S(x) then |
| 17        for i ∈ $\mathcal{A}_L$ do |
| 18           if $A_i(x_i) \neq$ NaN and $A_i(x_i) < \epsilon_s$ then |
| 19              S(x).append(L[i]) |
| 20           end |
| 21        end |
| 22     end |
| 23     return S(x) |

In the pseudo code listing illustrated above, the first "for" loop (lines 4-10) collects all features in a suspected issues list S(x) whose anomaly score have more than a given threshold $\epsilon_s$. These features are highly likely to be anomalies. Note this threshold $\epsilon_s$ is different from the threshold $\epsilon$ described earlier that determines whether or not an anomaly exists. Next, in the second "if" statement (lines 11-15), as long as there are enough features that are not NaN, if the number of suspected issues with large anomaly scores is greater than a minimum number, such as one, Cost is identified as the issue; otherwise, if the number of suspected issues with large anomaly scores is less than or equal to the minimum number, Cost is not identified as an issue. If there aren't enough features that are not NaN (e.g., num_not_nul<=2), Cost is identified as one of the suspected issues along with existing suspected issues (e.g., based on features with highest anomaly scores). The intuition in this example is that since the Cost is computed in a denominator of every feature, Cost is determined to include an error if the anomaly score from multiple features is large. For example, if at least two features are not NaN, then cost is identified as one an anomaly. If only a single feature has a large anomaly score, it is inferred that either the feature in the numerator or the Cost is an anomaly. In this case, both features are provided as an explanation (lines 6 and 12). In the final "if" statement (lines 16-22), a case when Cost is the suspected issue is handled. In this case, if Cost is a suspected issue and if there are any features that do not differ very much from Cost, i.e., $A_i(x_i) < \epsilon s$, that feature is also identified as an issue. As an example, consider two features, where price is $1 and a competitor price is $100, and log transformations (e.g., equation 3) are applied with a Cost of $1 in the denominator. The competitor price feature will result in a high anomaly score, which means the competitor price and Cost are inferred as issues.

In some examples, after identifying an anomaly, anomaly detection computing device 102 may prioritize the anomaly. High priority anomalies may be identified and transmitted to a review associate that may review the detected anomaly and determine if the price or cost update should be allowed. For example, if an item price is anomalous and has high priority, the price is not updated on the retailer's website (e.g., via server 104), and an alert is generated for a category specialist to review.

In some examples, anomaly detection computing device 102 prioritizes detected anomalies. The anomalies may be prioritized (e.g., high priority, or low priority) based on a determined business impact to a retailer. Prioritizing anomalies may assist a retailer who may have limited resources in investigating and possibly correcting every anomaly. In some examples, anomalies are prioritized based on the equation below:

$$business\_impACT = max\{profit\_loss, forgone\_revenue\}, \quad (eq. 10)$$

where:

$$profit\_loss = \max_i \{x_i - x_p\} \times Inventory, \quad (eq. 11)$$

$$forgone\_revenue = \min_i \{x_i\} \times Inventory, \quad (eq. 12)$$

$i \in A$, where A is a price feature set (e.g., baseline price feature set); and $x_i \neq x_p$.

Here, "profit_loss" is a loss that may be caused by an incorrect low price while "forgone_revenue" is a loss that may be caused as a result of an incorrect high price. A high priority anomaly may be one that has a business impact score at or above a threshold, while a low priority anomaly may be one that has a business impact score below the threshold. In some embodiments, additional levels of priority may be determined.

Figure 2:
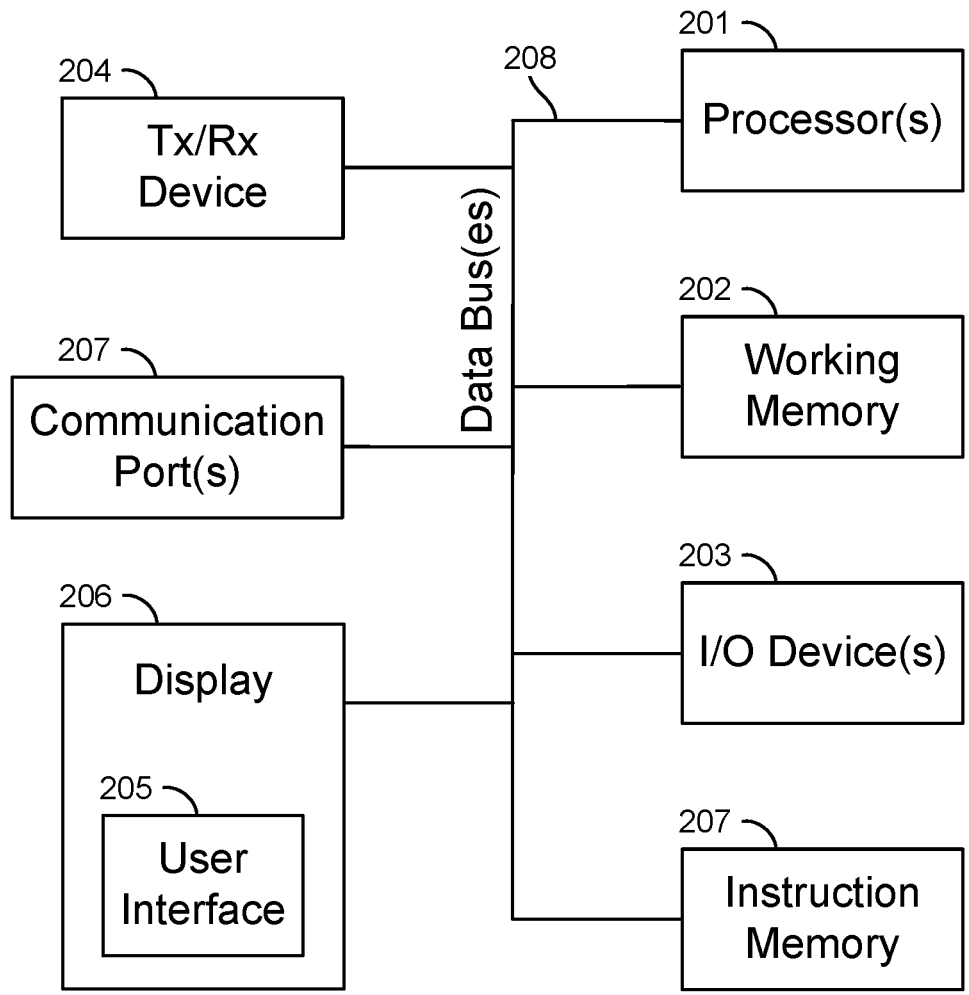
FIG. 2 is a block diagram of the anomaly detection computing device of the anomaly detection system of FIG. 1 in accordance with some embodiments.

FIG. 2 illustrates the anomaly detection computing device 102 of FIG. 1. Anomaly detection computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Processors 201 can be configured to perform a certain function or operation by executing code, stored on instruction memory 207, embodying the function or operation. For example, processors 201 can be configured to perform one or more of any function, method, or operation disclosed herein.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of anomaly detection computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 207 can include, for example, a serial port such as a universal asynchronous receiver/transmitter (UART) connection, a Universal Serial Bus (USB) connection, or any other suitable communication port or connection. In some examples, communication port(s) 207 allows for the programming of executable instructions in instruction memory 207. In some examples, communication port(s) 207 allow for the transfer (e.g., uploading or downloading) of data, such as machine learning algorithm training data.

Display 206 can display user interface 205. User interfaces 205 can enable user interaction with anomaly detection computing device 102. For example, user interface 205 can be a user interface for an application of a retailer that allows a customer to initiate the return of an item to the retailer. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 anomaly detection computing device 102 will be operating in. Processor(s) 201 is operable to receive data from, or send data to, a network, such as communication network 118 of FIG. 1, via transceiver 204.

Figure 3:
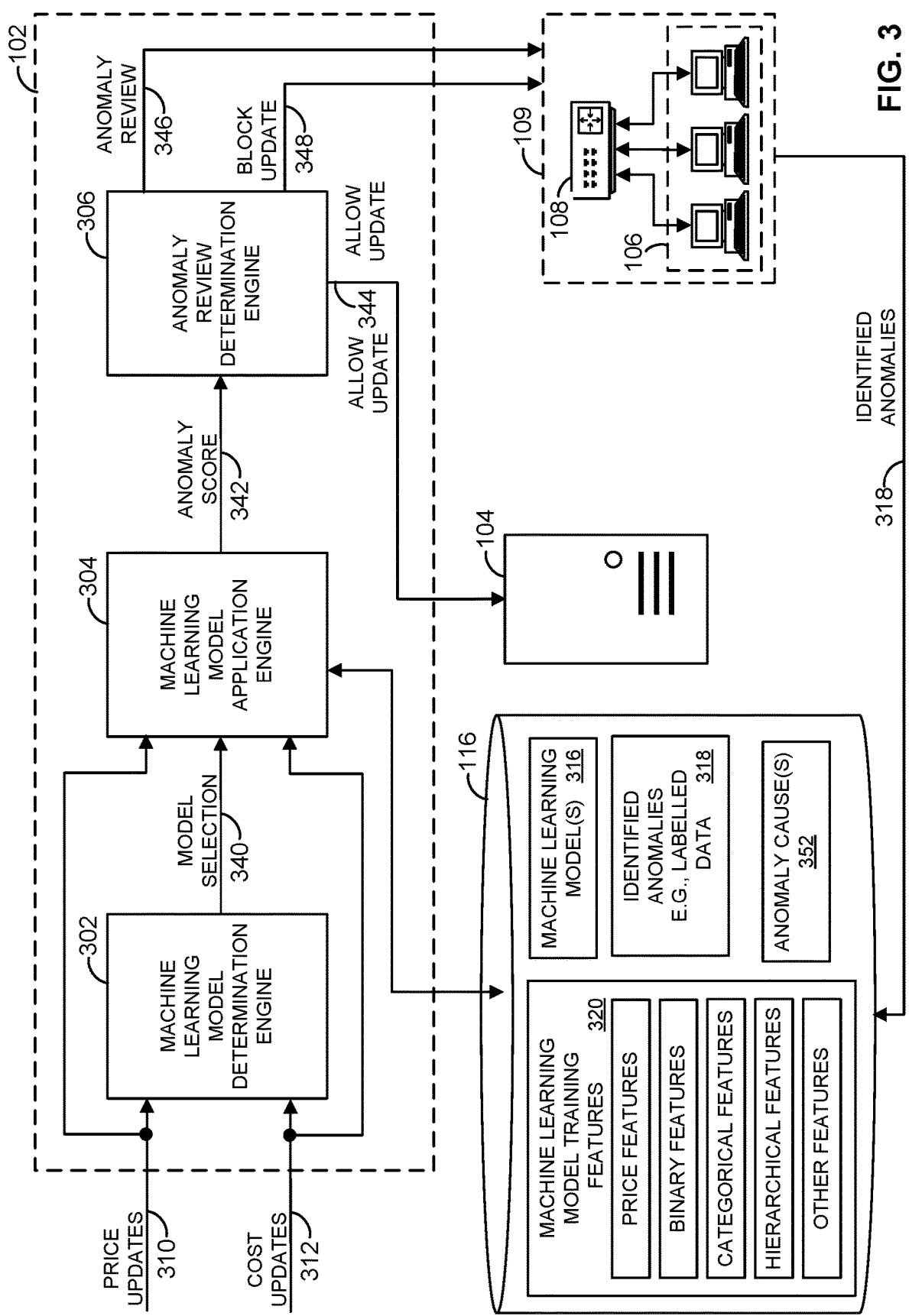
FIG. 3 is a block diagram illustrating examples of various portions of the anomaly detection system of FIG. 1 in accordance with some embodiments.

FIG. 3 is a block diagram illustrating examples of various portions of the anomaly detection system 100 of FIG. 1. As indicated in the figure, anomaly detection computing device 102 includes machine learning model determination engine 302, machine learning model application engine 304, and anomaly review determination engine 306. In some examples, one or more of machine learning model determination engine 302, machine learning model application engine 304, and anomaly review determination engine 306 may be implemented in hardware. In some examples, one or more of machine learning model determination engine 302, machine learning model application engine 304, and anomaly review determination engine 306 may be implemented as an executable program maintained in a tangible, non-transitory memory, such as instruction memory 207 of FIG. 2, that may be executed by one or processors, such as processor 201 of FIG. 2.

In this example, anomaly detection computing device 102 obtains price updates 310 and cost updates 312. Price updates 310 identifies prices for items whereas cost updates 312 identify the cost of items, such as items sold by a retailer. Price updates 310 and cost updates 312 may be obtained from a pricing system, such as one or more servers, that determine the updates based on the execution of one or more pricing or cost algorithms. The pricing or cost algorithms may consider both external and internal factors, for example. Price updates 310 and cost updates 312 may be received in real-time, e.g., when the pricing system determines a new price or cost of an item. In some examples, anomaly detection computing device 102 generates the price updates 310 and cost updates 312.

Machine learning model determination engine 302 may receive price updates 310 or cost updates 312, and determine a machine learning model to be used to determine whether the price or cost update is an anomaly. For example, machine learning model determination engine 302 may include an adjustable look-up table that identifies a machine learning model to be used for a price update or a cost update. In some examples, machine learning model determination engine 302 identifies one machine learning model for price updates 310, and another machine learning model for cost updates 312. In some examples, machine learning model determination engine 302 identifies the machine learning model based on an attribute of the item, such as a category. In some examples, machine learning model determination engine 302 identifies one machine learning model for price updates 310, and another machine learning model for cost updates 312. In some examples, machine learning model determination engine 302 identifies an unsupervised machine learning model (e.g., Guassian NB, Isolation Forest or Autoencoder) for price updates 310 and cost updates 312. In some examples, machine learning model determination engine 302 identifies a machine learning model that can be executed within a maximum amount of time (e.g., 1 millisecond, 10 milliseconds, etc.). The maximum amount of time may be based on how often price updates 310 and/or cost updates 312 are received. For example, the maximum amount of time is less than how often price updates 310 and/or cost updates 312 are received. Machine learning model determination engine 302 provides model selection 340, which identifies the machine learning model, to machine learning model application engine 304.

Machine learning model application engine 304 receives price updates 310 and cost updates 312, and applies (e.g., executes) a machine learning model as identified by model selection 340. For example, machine learning model application engine 304 may obtain a machine learning model 316 from database 116 based on the machine learning model identified by model selection 340. Machine learning model(s) 316 may identify and characterize any machine learning algorithm, such as a supervised and unsupervised machine learning algorithms.

Based on the application of a machine learning model to a price update 310 or cost update 312, machine learning model application engine 304 determines an anomaly score 342. The anomaly score 342 may be a probability that the price update 310 or cost update 312 is an anomaly. Anomaly score 342 may also identify feature anomaly scores. The feature anomaly scores may be based, for example, on equation 7 above. Machine learning model application engine 304 provides anomaly score 342 to anomaly review determination engine 306.

Anomaly review determination engine 306 receives anomaly score 342 and determines if the corresponding price update 310 or cost update 312 is an anomaly. If the price update 310 or cost update 312 is an anomaly, anomaly review determination engine 306 may generate and transmit anomaly review 346, which identifies the anomaly. For example, anomaly review 346 may identify an anomaly score 342, corresponding feature anomaly scores, and the corresponding price update 310 or cost update 312. Anomaly review may be transmitted to another computing device, such as workstation(s) 106 located at store 109. In some examples, anomaly review determination engine 306 generates an email or SMS identifying anomaly review 346, and transmits the email or SMS to another computing device, such as a smartphone operated by an associate of the retailer. The associate may then investigate the anomaly to determine whether the price update 310 or cost update 312 should be allowed. For example, the price update 310 or cost update 312 may be valid.

In some examples, anomaly review determination engine 306 determines if the price update 310 or cost update 312 is to be allowed. If the price update 310 or cost update 312 is to be allowed, anomaly review determination engine 306 transmits allow update 344 to another computing device, such as web server 104. As a result, the corresponding price update 310 or cost update 312 takes effect. For example, if a price update 310 is allowed, web server 104 may adjust the price of the corresponding item on the retailer's website accordingly. If a cost update 312 is allowed, web server 104 may adjust the price of the corresponding item based on the adjusted cost. In some examples, allow update 344 is transmitted to the pricing system. If anomaly review determination engine 306 determines that the price update 310 or cost update 312 is not to be allowed, price update 310 or cost update 312 may transmit block update 349 to workstations 106 at store 109. Block update 348 may identify to associates of the retailer that the corresponding price update 310 or cost update 312 was not allowed, and thus had not taken effect.

In some examples, anomaly review determination engine 306 prioritizes anomalies. For example, anomaly review determination engine 306 may determine whether an anomaly is a high priority anomaly, or a low anomaly priority, based on determining a business impact score. Business impact scores may be determined in accordance with equations 10, 11, and 12, for example. The priority of the anomaly may be identified by anomaly review 346.

In this example, workstations 106 receive anomaly review 346 and block update 348. Associates of a retailer may investigate an anomaly identified by anomaly review 346 to verify whether the corresponding price update 310 or cost update 312 is an anomaly. If the corresponding price update 310 or cost update 312 is an anomaly, workstations 106 may store the identified anomalies 318 in database 116. The identified anomalies may then be used to re-train one or more of the machine learning models 316. For example, anomaly detection computing device 102 may retrain one or more machine learning models 316 with machine learning model training features 320 and identified anomalies 318. Machine learning model training features 320 may include, for example, price features, binary features, categorical features, hierarchical features, or any other suitable features.

In some examples, identified anomalies 318 also identifies one or more causes of each anomaly. A cause of each anomaly may be determined based on review of each anomaly. For example, a retailer's associates investigating an anomaly may determine a particular feature, such as an advertised price of an item on a competitor's website, is incorrect. As a result, the retailer' associate may cause workstation 106 to transmit the identification of the cause in identified anomalies 318. In some examples, the cause of each anomaly is determined based on feature anomaly scores received via anomaly review 346. For example, workstation 106 may determine the cause of an anomaly to be due to a feature corresponding to the highest feature anomaly score. The causes of each anomaly may be stored in database 116 as anomaly causes 352.

Figure 4:
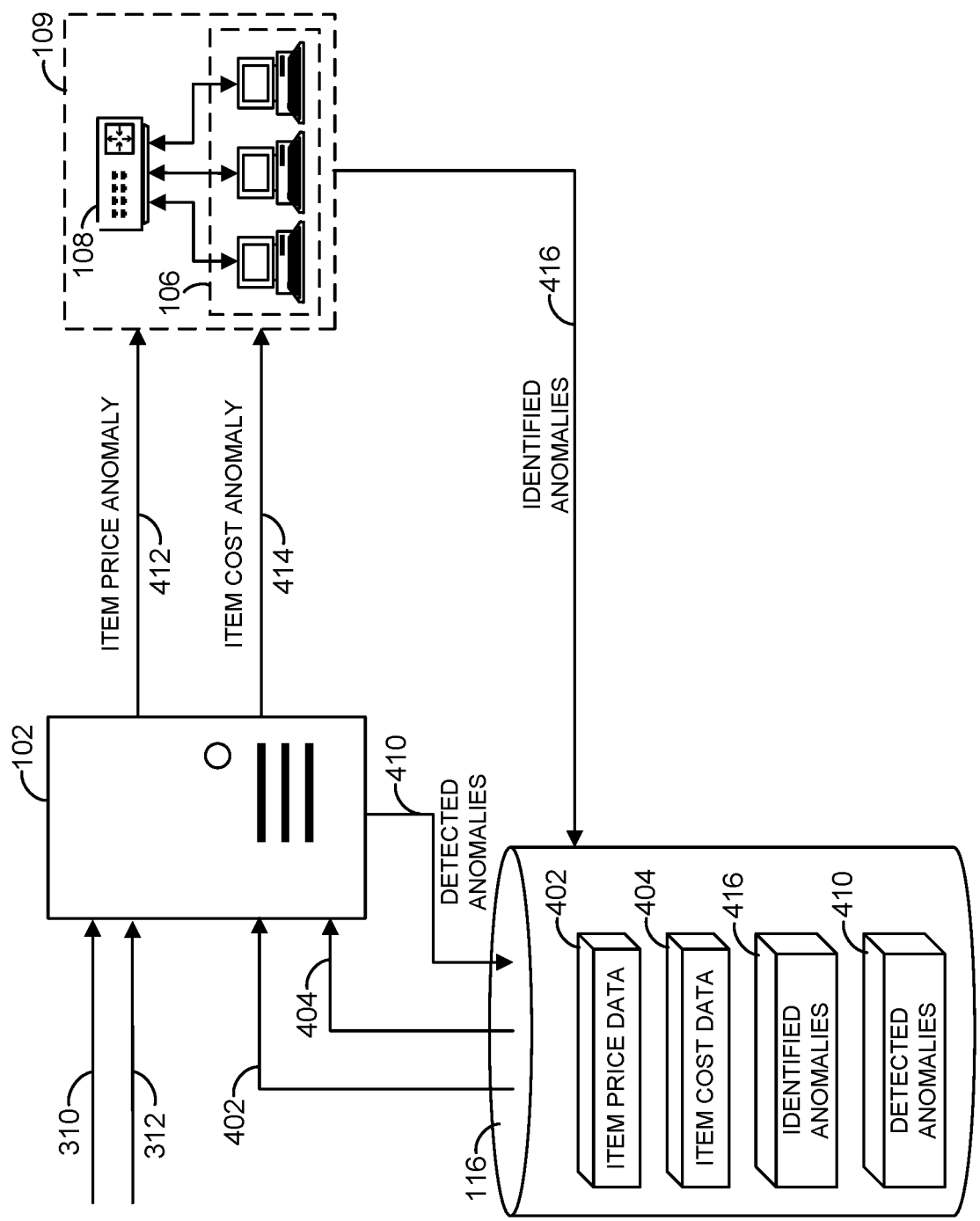
FIG. 4 is a block diagram illustrating examples of various portions of the anomaly detection computing device of FIG. 1 in accordance with some embodiments.

FIG. 4 is a block diagram illustrating examples of various portions of the anomaly detection system 100 of FIG. 1. In this example, anomaly detection computing device 102 obtains item price data 402 and item cost data 404 from database 116. Item price data 402 identifies a current price, such as a currently advertised price on a retailer's website, of each of a plurality of items. For example, item price data 402 may identify the price of every item a retailer has for sale online or in-store. Similarly, item cost data 402 identifies a current cost each of the plurality of items (e.g., the retailer's cost to provide the item for sale).

Anomaly detection computing device 102 may apply a machine learning algorithm, such as a supervised machine learning algorithm, to determine whether any price or cost for any item is an anomaly. Anomaly detection computing device 102 may apply the machine learning algorithms to item price data 402 and item cost data 404 periodically, such as daily (e.g., nightly), weekly, or monthly. Based on the application of the machine learning algorithms, anomaly detection computing device 102 may determine an anomaly score for each item price and each item cost. Based on the anomaly score, anomaly detection computing device 102 may determine whether the corresponding price or cost is an anomaly. For example, if the anomaly score is at or above a predetermined amount, anomaly detection computing device 102 may determine that the corresponding price or cost is an anomaly. In some examples, the predetermined amount is based on a function of historical anomaly data, such as historical anomaly scores, for the same or similar items. For example, the predetermined amount may be based on average anomaly data for the same item over the last month, 30 days, year, etc. Anomaly detection computing device 102 may store any detected anomalies 410 in database 116.

Anomaly detection computing device 102 may transmit item price anomaly 412 to workstations 106 at store 109 if a price of an item is determined to be an anomaly. Item price anomaly 412 may identify one or more of the item, the price (as identified by item price data 402), and the anomaly score. Similarly, anomaly detection computing device 102 may transmit item cost anomaly 414 to workstations 106 at store 109 if a cost of an item is determined to be an anomaly. Item price anomaly 412 may identify one or more of the item, the cost (as identified by item cost data 402), and the anomaly score. Item price anomaly 412 and item cost anomaly 414 may also each identify one or more feature anomaly scores, and a priority for each detected anomaly.

Associates of a retailer may investigate an anomaly identified by item price anomaly 412 or item cost anomaly 414 to verify whether the corresponding price or cost is an anomaly. If the corresponding price or cost is an anomaly, workstations 106 may store the identified anomalies 416 in database 116. In some examples, associates of the retailer investigate the reported anomalies. If the anomaly is valid, the associates may update the price of the corresponding item and/or correct what is causing the anomaly. For example, a pricing system may regenerate the price of the item based on one or more corrected features that were causing the anomaly, and the regenerated price for the item may be advertised on a retailer's website.

Figure 5:
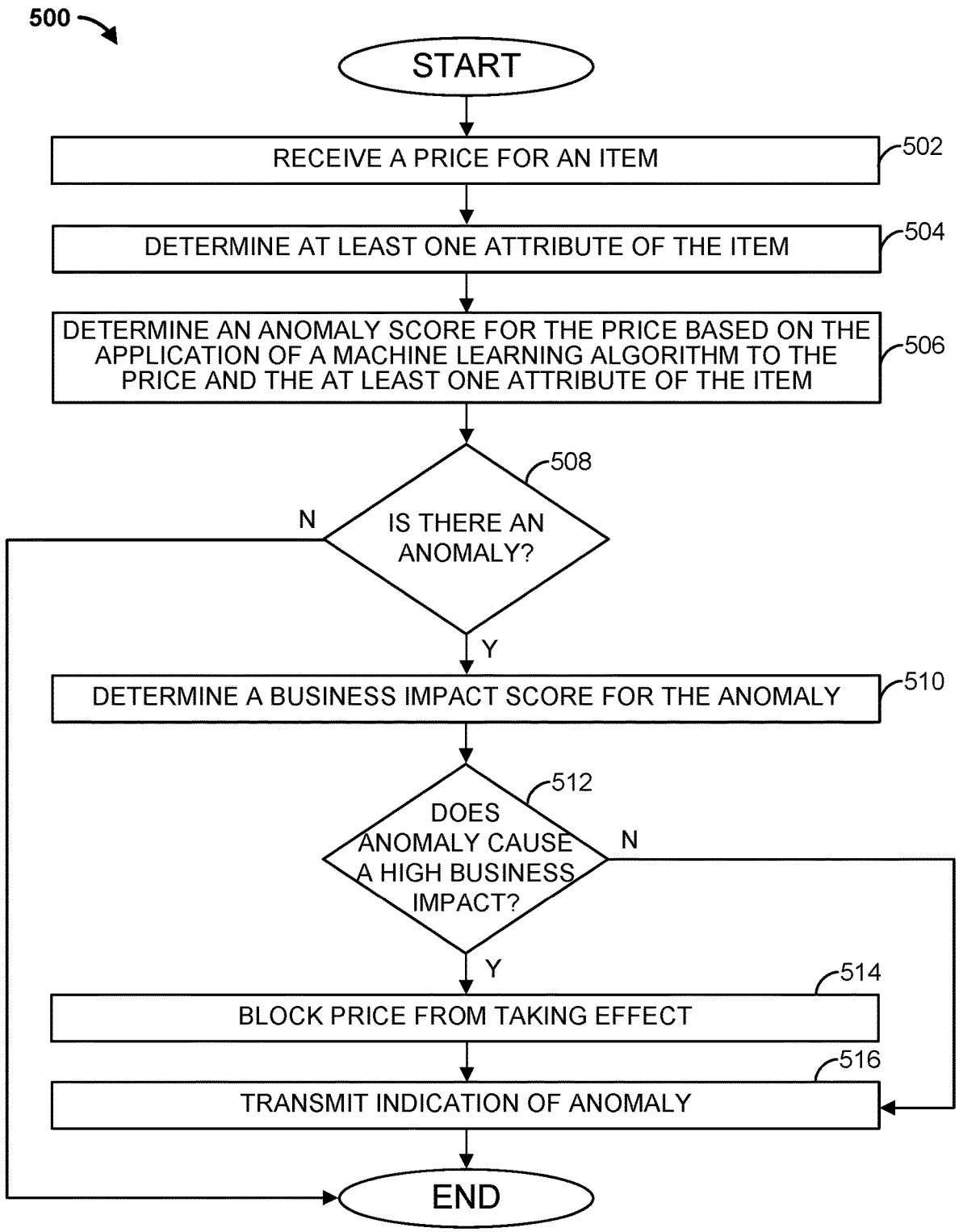
FIG. 5 is a flowchart of an example method that can be carried out by the anomaly detection system 100 of FIG. 1 in accordance with some embodiments.

FIG. 5 is a flowchart of an example method 500 that can be carried out by the anomaly detection system 100 of FIG. 1. Beginning at step 502, a computing device, such as anomaly detection computing device 102, receives a price, such as a price update, for an item. At step 504, anomaly detection computing device 102 determines at least one attribute of the item. For example, the attribute may be a type, a category, a sub-category, a department, a super-department, or a division of the item. Proceeding to step 506, a machine learning algorithm is applied to the price and the at least one attribute of the item to determine an anomaly score for the price.

Proceeding to step 508, a determination is made as to whether the price is an anomaly. For example, the determination may be made based on whether the anomaly score is at or above a predetermined amount. If the price is not an anomaly, the method ends. Otherwise, if the price is an anomaly, the method proceeds to step 510. At step 510, a business impact score for the anomaly is determined. The business impact score may be based on an estimated amount of profit that may be lost or revenue that is forgone.

Proceeding to step 512, a determination is made as to whether the anomaly causes a high business impact. For example, a determination may be made as to whether the business impact score is at or beyond a predetermined threshold. If the anomaly does not cause a high business impact, the method proceeds to step 516, where an indication of the anomaly is transmitted to another computing device, such as workstation 106 or web server 104. If, however, the anomaly does cause a high business impact, the method proceeds to step 514. At step 514, the price is blocked from taking effect. The method then proceeds to step 516, where the anomaly is transmitted to the other computing device. The method then ends.

Figure 6:
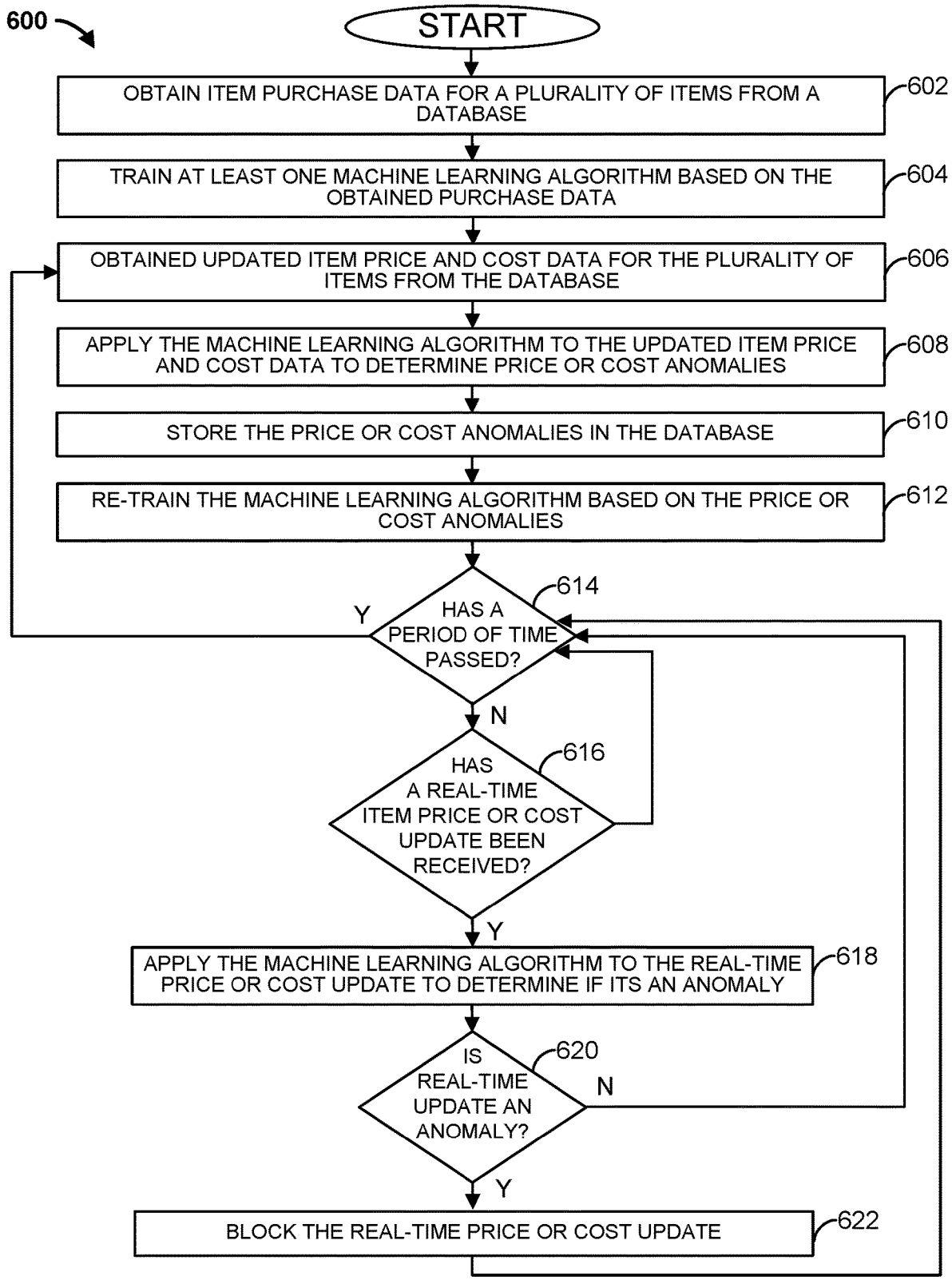
FIG. 6 is a flowchart of another example method that can be carried out by the anomaly detection system 100 of FIG. 1 in accordance with some embodiments.

FIG. 6 is a flowchart of another example method 600 that can be carried out by the anomaly detection system 100 of FIG. 1. At step 602, a computing device, such as anomaly detection computing device 102, obtains purchase data for a plurality of items from a database. For example, anomaly detection computing device 102 may obtain from database 116 purchase data identifying previous purchases made from a retailer's website hosted by web server 104. At step 604, at least one machine learning algorithm is trained based on the obtained purchase data. For example, anomaly detection computing device 102 may generate machine learning model training features 320 based on the purchase data, and train the one or more machine learning algorithms with the machine learning model training features 320.

Proceeding to step 606, updated item price and cost data for the plurality of items may be obtained from the database. For example, anomaly detection computing device 102 may obtain item price data 402 and/or item cost data 404 from database 116. At step 608, the trained machine learning algorithm is applied to the updated item price and cost data to determine price or cost anomalies. For example, anomaly detection computing device 102 may generate an anomaly score based on execution of the machine learning algorithm. If the anomaly score is above a threshold, anomaly detection computing device 102 may determine the price or cost update is an anomaly. At step 610, the anomaly is stored in a database, such by storing the anomaly with identified anomalies 318 in database 116.

At step 612, the machine learning algorithm is re-trained based on the stored anomaly. For example, anomaly detection computing device 102 may re-train the machine learning algorithm with identified anomalies 318 and machine learning model training features 320. Proceeding to step 614, a determination is made as to whether a period of time has elapsed. The period of time may be, for example, a day, a week, or a month. If the period of time has elapsed, the method proceeds back to step 606, where updated item price and cost data for the plurality of items is obtained from the database. Otherwise, if the period of time has not elapsed, the method proceeds to step 616.

At step 616, a determination is made as to whether a real-time price or cost update been received. For example, anomaly detection computing device 102 may determine whether a price update 310 or cost update 312 has been received. If a real-time price or cost update has not been received, the method proceeds back to step 614. Otherwise, if a real-time price or cost update has been received, the method proceeds to step 618. At step 618, the machine learning algorithm is applied to the real-time price or cost update to determine if the real-time price or cost update is an anomaly. For example, anomaly detection computing device 102 may determine an anomaly score for the real-time price or cost update based on applying the machine learning algorithm.

The method then proceeds to step 620, where a determination is made as to whether the real-time price or cost update is an anomaly. For example, anomaly detection computing device 102 may determine that the real-time price or cost update is an anomaly if the anomaly score is at or beyond a threshold. If the real-time price or cost update is not an anomaly, the method proceeds back to step 614. Otherwise, if the real-time price or cost update is an anomaly, the method proceeds to step 622, where the real-time price or cost update is blocked from taking effect. The method then proceeds back to step 614, to determine if the predetermined amount of time has elapsed.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
 a database; and
 a computing device communicatively coupled to the database, the computing device configured to:
  obtain historic transaction data from the database;
  train a machine learning model based on the historic transaction data to generate a trained machine learning model;
  receive over a network a value update for an item;
  obtain from the database a plurality of features associated with the item, wherein each of the plurality of features comprise at least one value;
  generate a feature transformation value for at least one feature of the plurality of features based on a log transformation of a first value of the at least one feature and a second value of a second feature of the plurality of features;
  apply the trained machine learning model to the value update and the feature transformation value to generate an anomaly score;
  determine the value update is an anomaly based on the anomaly score;
  determine a feature anomaly value for each feature of the plurality of features based on a first value of each feature and a second value of each feature;
  determine an anomaly causing feature of the plurality of features based on the determined feature anomaly values for each feature of the plurality of features;
  transmit data identifying the anomaly causing feature; and
  retrain the trained machine learning model using current transaction data including the value update and the feature transformation value to regenerate the anomaly score, wherein retraining causes the trained machine learning model to generate an updated anomaly score.

2. The system of claim 1, wherein the computing device is configured to store the data identifying the anomaly causing feature in the database.

3. The system of claim 1, wherein the computing device determines the log transformation of the at least one feature of the plurality of features according to $$\log\left(\frac{x_i + c_1}{x_c + c_1}\right) + c_2.$$

4. The system of claim 3, wherein the feature of $x_c$ is a cost feature.

5. The system of claim 1, wherein the computing device is configured to:
 determine, for each feature anomaly value, whether the feature anomaly value is above a threshold; and
 determine the anomaly causing feature comprises at least one of the features with the feature anomaly value above the threshold.

6. The system of claim 5, wherein the computing device is configured to:
 determine a number of feature anomaly values below the threshold; and
 determine the anomaly causing feature comprises the second feature when the number of feature anomaly values is below the threshold.

7. The system of claim 1, wherein the computing device is configured to:
 determine a highest feature anomaly value of the feature anomaly values; and determine that the anomaly causing feature corresponds to the highest feature anomaly value.

8. The system of claim 1 wherein the value update is an item price update, wherein the computing device is configured to transmit the data identifying the anomaly causing feature to a pricing system, causing the pricing system to not consider the item price update when determining a price for a corresponding item.

9. A method comprising:
obtaining historic transaction data from a database;
training a machine learning model based on the historic transaction data to generate a trained machine learning model;
receiving over a network a value update for an item;
obtaining from the database a plurality of features associated with the item, wherein each of the plurality of features comprise at least one value;
generating a feature transformation value for at least one feature of the plurality of features based on a log transformation of a first value of the at least one feature and a second value of a second feature of the plurality of features;
applying the trained machine learning model to the value update and the feature transformation value to generate an anomaly score;
determining the value update is an anomaly based on the anomaly score;
determining a feature anomaly value for each feature of the plurality of features based on a first value of each feature and a second value of each feature;
determining an anomaly causing feature of the plurality of features based on the determined feature anomaly values for each feature of the plurality of features;
transmitting data identifying the anomaly causing feature; and
retraining the trained machine learning model using current transaction data including the value update and the feature transformation value to regenerate the anomaly score, wherein retraining causes the trained machine learning model to generate an updated anomaly score.

10. The method of claim 9 comprising storing the data identifying the anomaly causing feature in the database.

11. The method of claim 9 comprising:
determining, for each feature anomaly value, whether the feature anomaly value is above a threshold; and
determining the anomaly causing feature comprises at least one of the features with the feature anomaly value above the threshold.

12. The method of claim 11 comprising:
determining a number of feature anomaly values below the threshold; and
determining the anomaly causing feature comprises the second feature when the number of feature anomaly values is below the threshold.

13. The method of claim 9 comprising:
determining a highest feature anomaly value of the feature anomaly values; and determining that the anomaly causing feature corresponds to the highest feature anomaly value.

14. The method of claim 9 wherein the value update is an item price update, further comprising transmitting the data identifying the anomaly causing feature to a pricing system, causing the pricing system to not consider the item price update when determining a price for a corresponding item.

15. A non-transitory computer readable medium having instructions stored thereon, wherein the instructions, when executed by at least one processor, cause a device to perform operations comprising:
obtaining historic transaction data from a database;
training a machine learning model based on the historic transaction data to generate a trained machine learning model;
receiving over a network a value update for an item;
obtaining from the database a plurality of features associated with the item, wherein each of the plurality of features comprise at least one value;
generating a feature transformation value for at least one feature of the plurality of features based on a log transformation of a first value of the at least one feature and a second value of a second feature of the plurality of features;
applying the trained machine learning model to the value update and the feature transformation value to generate an anomaly score;
determining the value update is an anomaly based on the anomaly score;
determining a feature anomaly value for each feature of the plurality of features based on a first value of each feature and a second value of each feature;
determining an anomaly causing feature of the plurality of features based on the determined feature anomaly values for each feature of the plurality of features;
transmitting data identifying the anomaly causing feature; and
retraining the trained machine learning model using current transaction data including the value update and the feature transformation value to regenerate the anomaly score, wherein retraining causes the trained machine learning model to generate an updated anomaly score.

16. The non-transitory computer readable medium of claim 15 further comprising instructions stored thereon that, when executed by at least one processor, further cause the device to perform operations comprising storing the data identifying the anomaly causing feature in the database.

17. The non-transitory computer readable medium of claim 15 further comprising instructions stored thereon that, when executed by at least one processor, further cause the device to perform operations comprising:
determining, for each feature anomaly value, whether the feature anomaly value is above a threshold; and
determining the anomaly causing feature comprises at least one of the features with the feature anomaly value above the threshold.

18. The non-transitory computer readable medium of claim 17 further comprising instructions stored thereon that, when executed by at least one processor, further cause the device to perform operations comprising:
determining a number of feature anomaly values below the threshold; and
determining the anomaly causing feature comprises the second feature when the number of feature anomaly values is below the threshold.

19. The non-transitory computer readable medium of claim 15 further comprising instructions stored thereon that, when executed by at least one processor, further cause the device to perform operations comprising:
determining a highest feature anomaly value; and
determining that the anomaly causing feature is the feature with the highest feature anomaly value.

20. The non-transitory computer readable medium of claim 15 further comprising instructions stored thereon that, when executed by at least one processor, further cause the device to perform operations comprising:
determining an updated frequency associated with the value update of the item;
determining an execution time limit for a computing device based on the update frequency; and
based on at least one of a type of the value update and an attribute of the item, determining a trained machine learning model that is configured to be executed within the execution time limit of the computing device, wherein the trained machine learning model is trained based on one or more machine learning model training features selected from price-based features, binary features, categorical features, hierarchical features, and feature transformations.

\* \* \* \* \*